Patented Aug. 31, 1926.

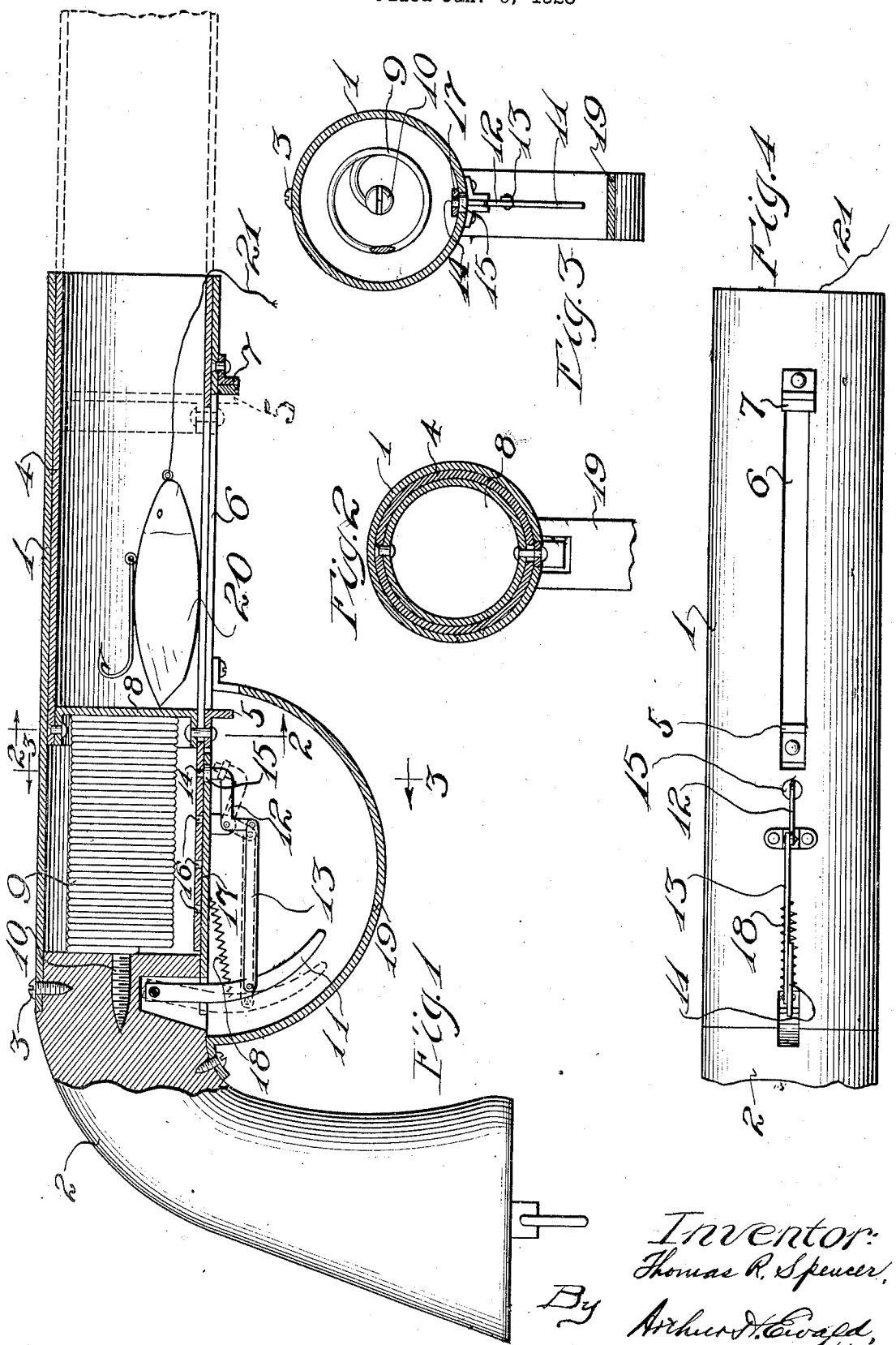

1,598,323

UNITED STATES PATENT OFFICE.

THOMAS R. SPENCER, OF LEBANON, OHIO.

BAIT-CASTING DEVICE.

Application filed January 6, 1926. Serial No. 79,636.

My invention relates to a device to be used by fishermen in casting bait.

It frequently happens that when fishing by the casting method, the surroundings are unfavorable to the casting of the fly or other bait used for the reason that there may be overhanging limbs or other obstructions which prevent the necessary momentum for casting the bait the required distance.

The principal object of this invention is to provide a simple and efficient means for casting the bait whereby the difficulty above mentioned may be eliminated.

In the drawings:—

Figure 1 is a longitudinal section of the device.

Figure 2 is a section on line 2—2 of Figure 1.

Figure 3 is a section on line 3—3 of Figure 1.

Figure 4 is a bottom view of a portion of the device.

The numeral 1 indicates a cylindrical barrel which is secured to a handle or stock 2 by means of screws 3 or other suitable means. Arranged to fit slidably in the barrel 1 is a cylindrical cup 4, the lower side of said cup being provided with a lug 5 which extends through a slot 6 in the barrel 1, said slot serving as a guide and retainer for the cup 4. The exterior of the barrel 1 at the end of the slot is provided with a stop 7 to limit the movement of the cup 4 in the barrel 1. Interposed between the base 8 of the cup and the stock 2 is a compression spring 9, one end of said spring being secured to the stock by means of a screw 10, as shown in Figure 3 of the drawings.

Pivotally mounted in the stock 2 is a trigger 11 which operates a bell crank 12 pivotally mounted on the barrel 1 through a link 13. The free end of the bell crank forms a dog 14 which is arranged to extend through a perforation 15 in the lower side of the barrel 1 and to engage in either one of a lineal series of perforations 16 in a bar 17 extending inwardly from the base of the cup 4. A tension spring 18 normally holds the dog in raised position so as to engage in the perforation 15 and one of the perforations 16 as shown in full lines in Figure 1. The stock and barrel are provided with a guard 19 for the trigger and connected mechanism.

The operation of the device will be apparent from the foregoing description. The cup 4 is of suitable size to receive a fly or other bait 20 to be used. The cup when so supplied is pressed into the base against the compression of spring 9 until the desired perforation 16 is engaged by the trigger operated dog 14, it being understood that the more the spring 9 is compressed the farther bait 20 will be cast. When so loaded, the device is operated in practically the same manner as a pistol, the operator pulling the trigger and thus releasing the cup 4 whereupon the spring 9 expands forcing outwardly the cup and forcibly ejecting the bait 20 secured to the line 21.

It will be seen that by the use of the device described bait may be cast to the desired distance without the requirement for an open space around the fisherman and he is thus enabled to make a successful cast when he would, in many instances, be prevented from throwing the bait to an effective spot.

It will be understood that modifications may be made in the details of construction without departing from the spirit and scope of the invention as above described and defined in the appended claims.

Having thus fully described my invention, what I claim as new and desire to secure by Letters Patent is:—

1. A bait casting device, comprising in combination with a cylindrical barrel, a cup slidably mounted in said barrel, said cup being adapted to loosely hold the bait to be cast, compression means between said cup and the barrel, whereby said cup may be forcibly actuated to expel said bait, a dog pivotally mounted in connection with said barrel, means on said cup arranged to be engaged by said dog, whereby said cup may be locked against compression of said compression means, and a trigger for actuating said dog to release said cup.

2. A bait casting device, comprising in combination with a cylindrical barrel, a cup slidably mounted in said barrel, said cup being adapted to loosely hold the bait to be cast, a compression spring between said cup and the barrel, whereby said cup may be forcibly actuated to expel said bait, a dog pivotally mounted in connection with said barrel, means on said cup arranged to be engaged by said dog, whereby said cup may be locked against compression of said compression spring, and a trigger for actuating said dog to release said cup.

THOMAS R. SPENCER.